United States Patent [19]

Noethen

[11] Patent Number: 5,475,415
[45] Date of Patent: Dec. 12, 1995

[54] OPTICAL HEAD AND PRINTING SYSTEM FORMING INTERLEAVED OUTPUT LASER LIGHT BEAMS

[75] Inventor: Mark L. Noethen, Rochester, N.Y.

[73] Assignee: Eastman Kodak Company, Rochester, N.Y.

[21] Appl. No.: 375,058

[22] Filed: Jan. 19, 1995

Related U.S. Application Data

[63] Continuation of Ser. No. 892,907, Jun. 3, 1992.

[51] Int. Cl.⁶ .............................. B41J 2/455; G02B 27/14
[52] U.S. Cl. .......................... 347/241; 347/243; 347/244; 347/238; 359/629
[58] Field of Search ...................... 347/241, 243, 347/134, 238, 244; 359/629, 634, 363

[56] References Cited

U.S. PATENT DOCUMENTS

| | | | |
|---|---|---|---|
| 4,053,898 | 10/1977 | Hirayama et al. | 346/1 |
| 4,253,102 | 2/1981 | Kataoka et al. | 346/108 |
| 4,256,368 | 3/1981 | Task | 359/634 X |
| 4,634,232 | 1/1987 | Tateoka | 350/394 |
| 4,651,169 | 3/1987 | Muka | 346/108 |
| 4,743,091 | 7/1988 | Gelbart | 350/252 |
| 4,763,134 | 8/1988 | Murahashi et al. | 346/108 X |
| 4,821,113 | 4/1989 | McQuade et al. | 346/108 |
| 4,892,371 | 1/1990 | Yamada et al. | 350/6.8 |
| 4,924,321 | 5/1990 | Miyagawa et al. | 346/108 X |
| 4,978,197 | 12/1990 | Horikawa | 350/174 |
| 4,986,634 | 1/1991 | Horikawa et al. | 350/174 |
| 5,258,776 | 11/1993 | Guy | 347/237 |

*Primary Examiner*—Benjamin R. Fuller
*Assistant Examiner*—David Yockey
*Attorney, Agent, or Firm*—Marc A. Rossi

[57] ABSTRACT

An optical head and printing system for printing an image on a light sensitive print medium includes polarized beam splitting means, and a first and a second group of lasers. The polarized beam splitting means passes light beams with a first polarization propagating from a first surface to a second opposing surface thereof, and reflects light beams with a second orthogonal polarization propagating from a third surface to the second surface thereof. The first group of lasers are disposed in a first plane adjacent the first surface of the polarized beam splitting means for transmitting a first group of diverging laser light beams which are polarized with the first polarization. The second group of lasers are disposed in a second plane adjacent the third surface of the polarized beam splitting means for transmitting a second group of diverging laser light beams which are polarized with the second polarization. The lasers in the first and second group of lasers are positioned at the first and second planes, respectively, with spacings that provide interleaved first and second polarized light beams exiting the second surface of the polarized beam splitting means.

27 Claims, 3 Drawing Sheets

OPTICAL HEAD AND PRINTING SYSTEM FORMING INTERLEAVED OUTPUT LASER LIGHT BEAMS

This is a Continuation of U.S. application Ser. No. 892,907, filed 03 Jun. 1992.

FIELD OF THE INVENTION

The present invention relates to techniques for combining multiple laser beams to form multiple beam optical heads.

BACKGROUND OF THE INVENTION

It is desirable to combine multiple laser beams in an optical writing head to increase the speed of writing an image or document on a print medium. Various techniques are known in the prior art for achieving such result.

U.S. Pat. No. 4,634,232 (M. Tateoka), issued on Jan. 6, 1987, discloses a light source device for providing close spacing of two light beams. In the device, first and second semiconductor lasers are polarized with a predetermined polarization and directed in a plane orthogonal to each other. Optical means capable of rotating the plane of polarization of an incident beam by approximately 90 degrees is disposed between one of the semiconductor lasers and a polarizing beam splitter having an polarization interference film therein. The first and second semiconductor lasers are disposed so that a laser beam from the first laser is polarized so that it is transmitted through the interference film in the polarizing beam splitter while the second laser beam is polarized so that it is reflected by the interference film of the polarizing beam splitter. After passing through the polarizing beam splitter, cross-sectional major and minor directions of the first beam are coordinated with the major and minor directions, respectively, of the second beam.

Various techniques have been provided for combining more than two laser beams in an optical writing head. For example, U.S. Pat. No. 4,743,091 (D. Gelbart), issued on May 10, 1988, discloses a two-dimensional laser diode array for use in optical data storage. The array comprises rows and columns of laser diodes, each diode including a separate collimating lens. The array is imaged onto an optical recording medium which is moving relative to the array image to provide scanning. Since the distance between the individual laser diodes is large, the apparent distance between the array and a scanning lens has to be large. A reverse telescope is used between the array and the scanning lens to significantly reduce this distance. To further reduce this distance, the laser diodes are made to appear closer at the recording medium than their mechanical separation at the array by staggering the laser diodes in the array in a direction perpendicular to the scanning direction (skewing the rows).

U.S. Pat. No. 4,978,197 (K. Horikawa), issued on Dec. 18, 1990, discloses a beam-combining laser beam source device. The device comprises first and second laser beam source sections, and a beam combining optical element such as a polarization beam splitter. Each beam source section includes laser beam sources, a collimator optical system, and optical path adjusting elements. Each collimator optical system comprises lens groups corresponding to the laser beams sources, and a common lens positioned so that the laser light beams radiated from the optical path adjusting elements, along optical paths parallel and close to one another, impinge the common lens. All common lenses are movable along first directions parallel to their optical axes and along second directions normal to the optical axes. Laser light beams from the first and second laser beam source sections are moved along first directions normal to each other and combined by movement of the common lenses along second directions. For a similar arrangement, see U.S. Pat. No. 4,986,634 (K. Horikawa et al.), issued on Jan. 22, 1991.

U.S. patent application Ser. No. 749,037, U.S. Pat. No. 5,258,776 (T. Mackin et al.), filed on Aug. 23, 1991, discloses a thermal printer which includes a thermal print head mounting a plurality of N thermal heating devices such as lasers or resistive heating elements. In the thermal printer, a receiver member is mounted on a rotating drum with a dye carrier member engaging the outer surface of the receiver member in a dye frame image printing area. The thermal heating devices are aligned at a predetermined acute angle theta to a line normal to the rotation of the drum. During high speed rotation of the drum, the thermal heating devices are selectively energized by micropixel clock pulses which are synchronized to the rotational speed of the drum. During each rotation of the drum, N columns of micropixels are printed on the receiver member. Additionally, the energizing of each of the thermal heating elements is timed using the micropixel clock pulses so as to print corresponding micropixels of the N columns of micropixels in a line normal to the rotation of the drum. A requirement to align the line of thermal heating devices at the acute angle theta can result in tight tolerances on the mechanical spacing of the thermal heating devices in a lateral direction, depending on the type of media, modulation scheme, and resolution. Additionally, there must be a time delay between the modulation of the thermal heating devices to account for the offset in scan direction due to the rotation angle being non-zero. A problem with providing more than two laser diodes which are aligned and rotated by the acute angle theta is that a tight tolerance on the mechanical spacing of the laser diodes is necessary in a lateral direction depending on the type of print medium, modulation technique, and resolution used.

It is desirable to provide techniques for combining multiple laser beams to form multiple spot optical heads which reduces mechanical tolerances on the spacing of the laser diodes in the lateral direction.

SUMMARY OF THE INVENTION

The present invention is directed to techniques for combining multiple laser beams to form multiple spot optical heads that reduce mechanical tolerances on the spacing of laser diodes in the lateral direction by eliminating a need for rotation of a line or an array of the multiple optical lasers to achieve proper spot spacings.

Viewed from one aspect, the present invention is directed to an optical head for printing an image on a light sensitive print medium. The optical head comprises polarized beam splitting means, and a first and a second group of lasers. The polarized beam splitting means passes light beams with a first polarization propagating from a first surface of the polarized beam splitting means to a second opposing surface thereof, and reflects light beams with a second polarization orthogonal to the first polarization propagating from a third surface of the polarized beam splitting means to the second surface thereof. The first group of lasers is disposed in a first plane adjacent the first surface of the polarized beam splitting means for transmitting a first group of diverging laser light beams which are polarized with the first polarization. The second group of lasers is disposed in a second plane adjacent the third surface of the polarized beam splitting means for transmitting a second group of diverging laser light beams which are polarized with the second polarization. The lasers in the first and second group of lasers at the first and second planes, respectively, have spacings therebetween that provide interleaved first and second polarized light beams at the second surface of the polarized beam splitting means.

Viewed from another aspect, the present invention is directed to a printing system for printing an image on a light sensitive print medium. The printing system comprises polarized beam splitting means, a first and a second group of lasers, and an optical system. The polarized beam splitting means passes light beams with a first polarization propagating from a first surface of the polarized beam splitting means to a second opposing surface thereof, and reflects light beams with a second polarization orthogonal to the first polarization propagating from a third surface thereof to the second surface thereof. The first group of lasers is disposed in a first plane adjacent the first surface of the polarized beam splitting means for transmitting a first group of diverging laser light beams which are polarized with the first polarization. The second group of lasers is disposed in a second plane adjacent the third surface of the polarized beam splitting means for transmitting a second group of diverging laser light beams which are polarized with the second polarization. The lasers in the first and second group of lasers at the first and second planes, respectively, have spacings there between that provide interleaved first and second polarized light beams at the second surface of the polarized beam splitting means. The optical system causes the first and second group of light beams to form at least one row or column of corresponding spots on the light sensitive print medium.

The invention will be better understood from the following more detailed description taken with the accompanying drawings and claims.

The drawings are not necessarily to scale.

DETAILED DESCRIPTION

It is to be understood hereinafter that corresponding elements in the various figures have the same designation numbers and functions.

Figure 1:
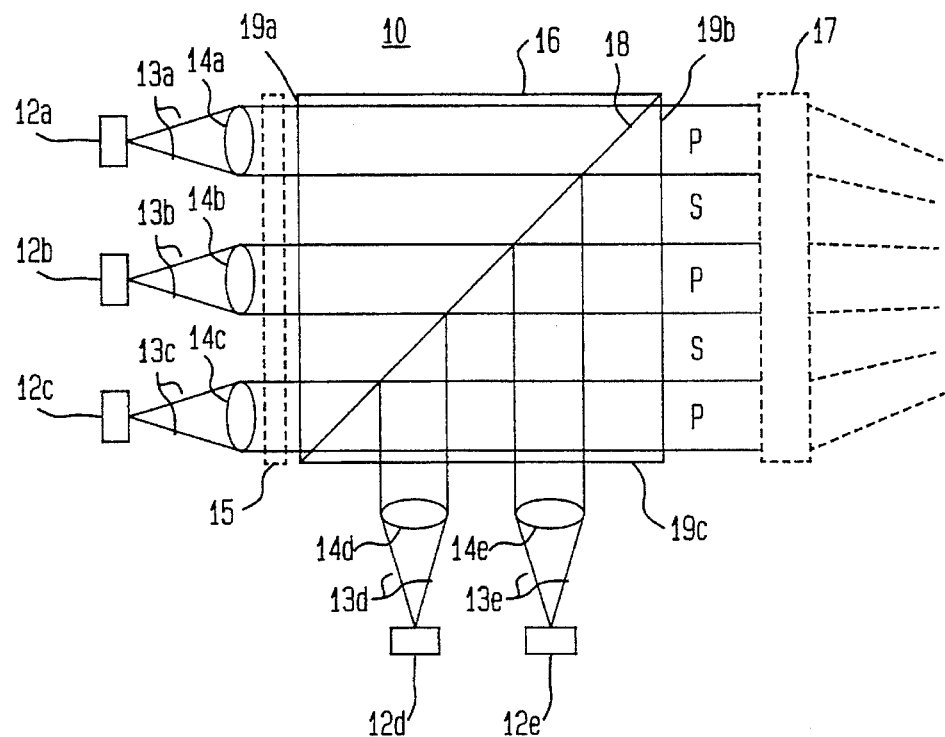
FIG. 1 is a block diagram of a multiple beam optical head in accordance with a first embodiment of the present invention.

Referring now to FIG. 1, the is shown a block diagram of a multiple beam optical head 10 in accordance with a first embodiment of the present invention. The multiple beam optical head 10 comprises (a) first, second, third, fourth, and fifth lasers designated 12a, 12b, 12c, 12d, and 12e, respectively, which generate respective diverging first, second, third, fourth, and fifth light beams designated 13a, 13b, 13c, 13d, and 13e, respectively, (b) first, second, third, fourth, and fifth collimating lens means designated 14a, 14b, 14c, 14d, and 14e, respectively, and (c) a polarizing beam splitting cube 16 with a polarization sensitive 18 formed therein.

The first, second, and third lasers 12a, 12b, and 12c are disposed on a first side 19a of the polarizing beam splitting cube 16 and are arranged to provide P-type linearly polarized diverging light beams 13a, 13b, and 13c, respectively. The P-type linearly polarized diverging light beams 13a, 13b, and 13c are collimated by the first, second, and third collimating lens means designated 14a, 14b, 14c, respectively, to have a spacing therebetween which is equal to the size of a collimated light beam. In other words, the spacing of the lasers 12a, 12b, and 12c is twice that of an exit pupil beam size of each of the collimating lens means 14a, 14b, and 14c. This leaves plenty of room for any mounting hardware (not shown) for the lasers 12a, 12b, and 12c, and the collimating lens means 14a, 14b, and 14c. The collimated P-type linearly polarized light beams 13a, 13b, and 13c enter the first side 19a of the polarizing beam splitting cube 16 and propagate therethrough. More particularly, the polarization sensitive 18 of the polarizing beam splitting cube 16 is arranged to pass the first, second, and third P-type linearly polarized light beams 13a, 13b, and 13c therethrough so that the first, second and third light beams 13a, 13b, and 13c exit a second side opposite the first side 19a.

The fourth and fifth lasers 12d and 12e are disposed on a third side 19c of the polarizing beam splitting cube 16 which is orthogonal to the first side 19a, and are arranged to provide S-type linearly polarized light beams 13d and 13e, respectively. More particularly, the fourth and fifth S-type linearly polarized light beams 13d and 13e are polarized orthogonally to the first, second, and third P-type linearly polarized light beams 13a, 13b, and 13b. The S-type linearly polarized light beams 13d and 13e are collimated by the fourth and fifth collimating lens means designated 14d and 14e, respectively, to have a spacing therebetween which is equal to the diameter of a collimated light beam. In other words, the spacing of the lasers 12d and 12e is twice that of an exit pupil beam size of each of the collimating lens means 14d and 14e. This leaves plenty of room for any mounting hardware (not shown) for the lasers 13d and 13e and the collimating lens means 14d and 14e.

The collimated fourth and fifth S-type linearly polarized light beams 13d and 13e enter the third side 19c of the polarizing beam splitting cube 16. The polarization sensitive 18 of the polarizing beam splitting cube 16 is arranged to reflect the fourth and fifth S-type linearly polarized light beams 13d and 13e so that the fourth and fifth S-type linearly polarized light beams 13d and 13e exit the second side 19b opposite the first side 19a.

By properly spacing the first, second, and third lasers 12a, 12b, and 12c, on the first side 19a of the polarizing beam splitting cube 16, and the fourth and fifth lasers 12d and 12e on the third side 19c of the polarizing beam splitting cube 16 at twice the exit pupil beam size, the P-type and S-type polarized light beams are interleaved and just touch the adjacent orthogonally polarized light beams at the second side 19b of the polarizing beam splitting cube 16. The multiple beam optical head 10 provides collimated polarized light beams 13a, 13b, 13c, 13d, and 13e that have equal path lengths, and are spaced to just touch the adjacent light beams on exiting the second side 19b of the polarizing beam splitting cube 16. The collimated and interleaved light beams 13a, 13b, 13c, 13d, and 13e exiting the second side 19b of the polarizing beam splitting cube 16 can then be focussed at a predetermined plane by optical focussing means (not shown) if required.

As an option, a half wave retarder plate 15 (shown as a dashed-line block) can be positioned adjacent either one of the first side 19a or the third side 19c of the polarizing beam splitting cube 16. For purposes of illustration only, the half wave retarder plate 15 is shown positioned adjacent first side 19a but can instead be positioned adjacent third side 19c of the polarizing beam splitting cube 16. Still further, it is optional to position a "beam shaping and pointing optics" 17 (shown as a dashed-line block) near the second side 19b of the polarizing beam splitting cube 16. With the use of half wave retarder plate 15 and the beam shaping and pointing optics 17 all major and minor axes of the beams 13a, 13b, 13c, 13d, and 13e have the same orientation. This allows all of the light beams 13a, 13b, 13c, 13d, and 13e to be shaped by the same beam shaping and point optics 17 after the light beams exit the second side 19b of the polarizing beam splitting cube 16. Advantageously, this permits the size of the polarizing beam splitting cube 16 to be held to a minimum, and keeps the cost low for producing the multiple beam optical head 10.

Figure 2:
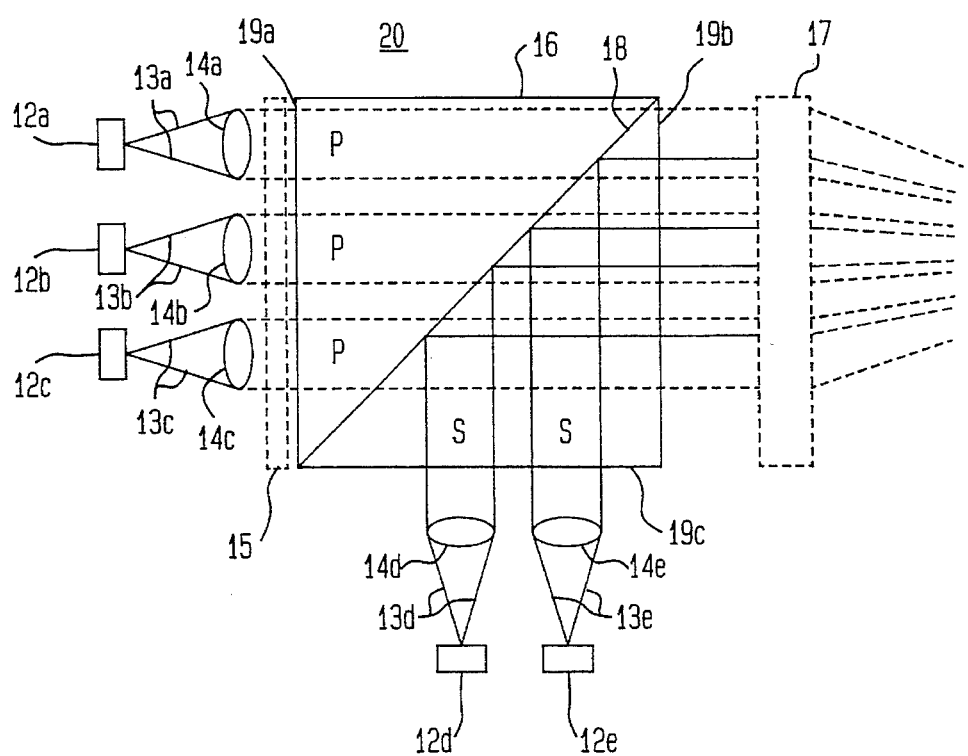
FIG. 2 is a block diagram of a multiple beam optical head printing system in accordance with a second embodiment of the present invention.

Referring now to FIG. 2, there is shown a block diagram of a multiple beam optical head 20 in accordance with a second embodiment of the present invention. The multiple beam optical head 20 comprises (a) first, second, third, fourth, and fifth lasers designated 12a, 12b, 12c, 12d, and 12e, respectively, which generate respective diverging first, second, third, fourth, and fifth light beams designated 13a, 13b, 13c, 13d, and 13e, respectively, (b) first, second, third, fourth, and fifth collimating lens means designated 14a, 14b, 14c, 14d, and 14e, respectively, and (c) a polarizing beam splitting cube 16 with a polarization sensitive 18 formed therein.

The first, second, and third lasers 12a, 12b, and 12c are disposed on a first side 19a of the polarizing beam splitting cube 16, and are arranged to provide P-type linearly polarized diverging light beams 13a, 13b, and 13c, respectively. The P-type linearly polarized diverging light beams 13a, 13b, and 13c are collimated by the first, second, and third collimating lens means designated 14a, 14b, and 14c, respectively, and have a spacing therebetween which is less than the diameter of a collimated light beam. In other words, the spacing of the lasers 12a, 12b, and 12c is less than twice that of an exit pupil beam size at the output of the collimating lens means 14a, 14b, and 14c. This leaves sufficient room for any mounting hardware (not shown) for the lasers 12a, 12b, and 12c and the collimating lens means 14a, 14b, and 14c. The collimated P-type linearly polarized light beams 13a, 13b, and 13c enter the first side 19a of the polarizing beam splitting cube 16 and pass therethrough. More particularly, the polarization sensitive 18 of the polarizing beam splitting cube 16 is arranged to pass therethrough the first, second, and third collimated P-type linearly polarized light beams 13a, 13b, and 13c so that the first, second and third light beams exit the polarizing beam splitting cube 16 at a second side 19b opposite the first side 19a.

The fourth and fifth lasers 12d and 12e are disposed on a third side 19c of the polarizing beam splitting cube 16 which is orthogonal to the first side 19a. The fourth and fifth lasers 12d and 12e are arranged to provide S-type linearly polarized diverging light beams 13d, and 13e, respectively. More particularly, the fourth and fifth S-type linearly polarized diverging light beams 13d and 13e are polarized orthogonally to the first, second, and third P-type linearly polarized light beams 13a, 13b, and 13b. The fourth and fifth S-type linearly polarized light beams 13d and 13e are collimated by the fourth and fifth collimating lens means designated 14d and 14e, respectively, and have a spacing therebetween which is less than the diameter of a collimated light beam. In other words, the spacing of the lasers 12d and 12e is less than twice that of an exit pupil beam size at the output of the fourth and fifth collimating lens means 14d and 14e. This leaves sufficient room for any mounting hardware (not shown) for the lasers 12d and 12e and the collimating lens means 14d and 14e.

The collimated fourth and fifth S-type linearly polarized light beams 13d and 13e enter the third side 19c of the polarizing beam splitting cube 16. The polarization sensitive 18 of the polarizing beam splitting cube 16 is arranged to reflect the fourth and fifth S-type linearly polarized light beams 13d and 13e so that the fourth and fifth collimated S-type linearly polarized light beams 13d and 13e exit the second side 19b of the polarizing beam splitting cube 16 opposite the first side 19a. By spacing the first, second, and third lasers 12a, 12b, and 12c, on the first side 19a of the polarizing beam splitting cube 16, and the fourth and fifth lasers 12d and 12e on the third side 19c of the polarizing beam splitting cube 16 at less than twice the exit pupil beam size, the collimated P-type and S-type polarized light beams are interleaved and overlap the adjacent oppositely polarized light beam by a predetermined amount at the second side 19b of the polarizing beam splitting cube 16. The multiple spot optical head 20 provides collimated polarized light beams that have equal path lengths and overlap the adjacent light beams on exiting the second side 19b of the polarizing beam splitting cube 16. Alternatively, the first, second, third, fourth and fifth lasers 12a, 12b, 12c, 12d and 12e can be spaced in the multiple beam optical head 20 at more than twice the exit pupil beam size so that adjacent light beams do not touch or overlap each other. If required, the collimated and interleaved light beams 13a, 13b, 13c, 13d, and 13e exiting the second side 19b of the polarizing beam splitting cube 16 can then be focussed and combined at a predetermined plane by optical focussing means (not shown).

As an option, a half wave retarder plate 15 (shown as a dashed-line block) can be positioned adjacent either one of the first side 19a or the third side 19c of the polarizing beam splitting cube 16. For purposes of illustration only, the half wave retarder plate 15 is shown positioned adjacent first side 19a but can instead be positioned adjacent third side 19c of the polarizing beam splitting cube 16. Still further, it is optional to position a "beam shaping and pointing optics" 17 (shown as a dashed-line block) near the second side 19b of the polarizing beam splitting cube 16. With the use of half wave retarder plate 15 and the beam shaping and pointing optics 17 all major and minor axes of the beams 13a, 13b, 13c, 13d, and 13e have the same orientation. This allows all of the light beams 13a, 13b, 13c, 13d, and 13e to be shaped by the same beam shaping and point optics 17 after the light beams exit the second side 19b of the polarizing beam splitting cube 16.

Figure 3:
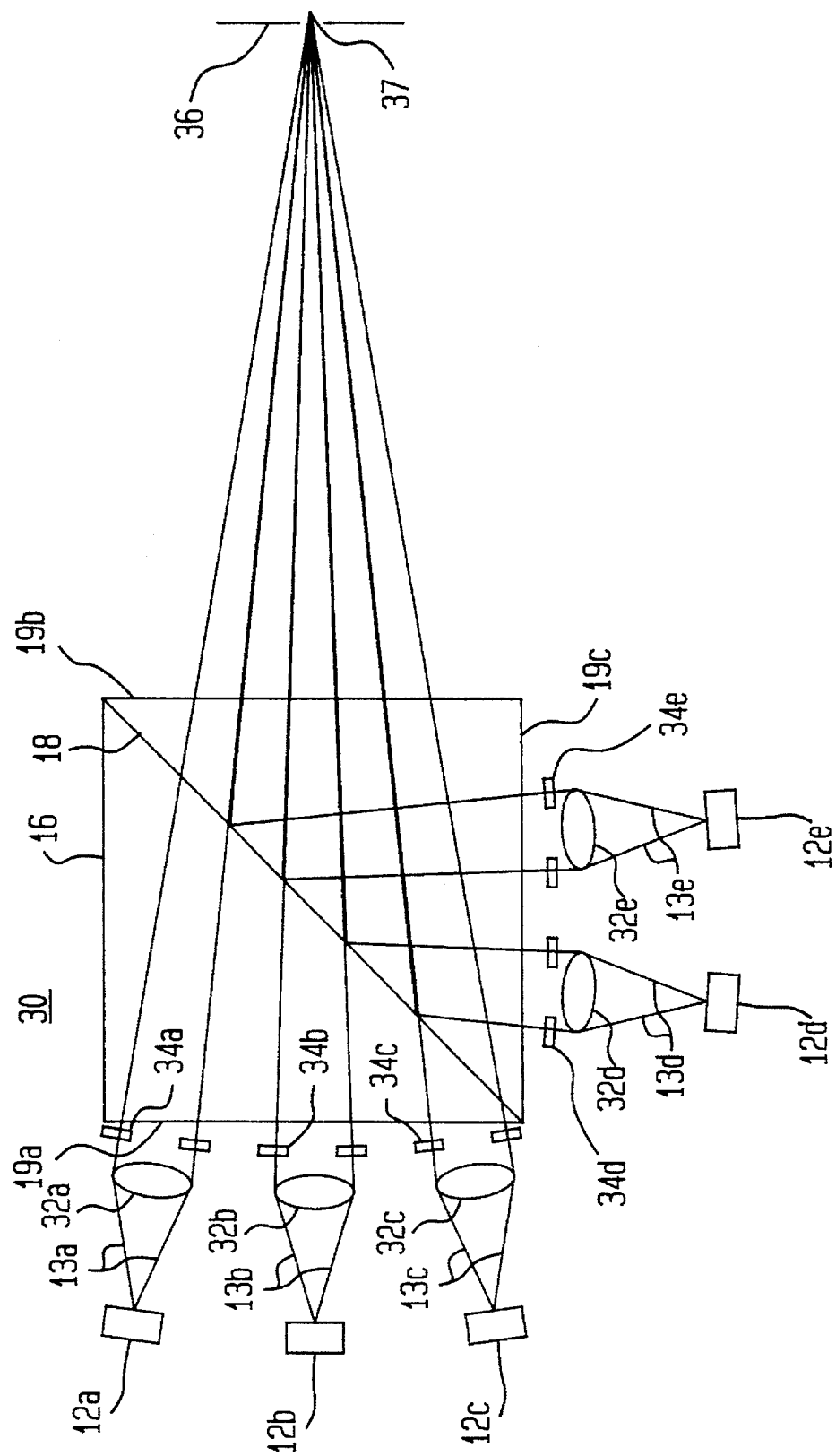
FIG. 3 is a block diagram of a multiple beam optical head printing system in accordance with a third embodiment of the present invention.

Referring now to FIG. 3, there is shown a block diagram of a multiple beam optical head 30 in accordance with a third embodiment of the present invention. The multiple spot optical head 30 comprises (a) first, second, third, fourth, and fifth lasers designated 12a, 12b, 12c, 12d, and 12e, respectively, which generate respective diverging first, second, third, fourth, and fifth diverging light beams designated 13a, 13b, 13c, 13d, and 13e, respectively, (b) first, second, third, fourth, and fifth focusing lens means designated 32a, 32b, 32c, 32d, and 32e, respectively, (c) first, second, third, fourth, and fifth lens apertures designated 34a, 34b, 34c, 34d, and 34e, respectively, for controlling the size of the respective first, second, third, fourth, and fifth light beams 13a, 13b, 13c, 13d, and 13e, (d) a polarizing beam splitting cube 16 with a polarization sensitive 18 formed therein, and (d) a stop plane 36 defining a stop aperture 37 therein.

The first, second, and third lasers 12a, 12b, 12c are disposed on a first side 19a of the polarizing beam splitting cube 16 and are arranged to provide first, second, and third P-type linearly polarized diverging light beams 13a, 13b, and 13c, respectively. The first, second, and third P-type linearly polarized diverging light beams 13a, 13b, and 13c are focused towards the stop aperture 37 of the stop plane 36 by the first, second, and third focussing lens means 32a, 32b, and 32c, respectively. The focussed P-type linearly polarized light beams 13a, 13b, and 13c enter the first side 19a of the polarizing beam splitting cube 16 and pass therethrough. More particularly, the polarization sensitive 18 of the polarizing beam splitting cube 16 is arranged to pass the first, second, and third focussed P-type linearly polarized light beams 13a, 13b, and 13c so that the light beams exit a second side of the polarizing beam splitting cube 16 opposite the first side 19a and are focussed and combined at the stop aperture 37.

The fourth and fifth lasers 12d and 12e are disposed on a third side 19c of the polarizing beam splitting cube 16 which is orthogonal to the first side 19a, and are arranged to provide S-type linearly polarized diverging light beams 13d and 13e, respectively. More particularly, the fourth and fifth S-type linearly polarized diverging light beams 13d and 13e are polarized orthogonally to the first, second, and third P-type linearly polarized diverging light beams 13a, 13b, and 13b. The fourth and fifth S-type linearly polarized light beams 13d and 13e are focussed by the fourth and fifth focussing lens means designated 14d and 14e, respectively.

The focussed fourth and fifth S-type linearly polarized light beams 13d and 13e enter the third side 19c of the polarizing beam splitting cube 16. The polarization sensitive 18 of the polarizing beam splitting cube 16 is arranged to reflect the fourth and fifth S-type linearly polarized light beams 13d and 13e so that the light beams exit the second side 19b side opposite the first side 19a and are focussed and combined at the stop aperture 37. By properly spacing the first, second, and third lasers 12a, 12b, and 12c on the first side 19a of the polarizing beam splitting cube 16, and the fourth and fifth lasers 12d and 12e on the third side 19c of the polarizing beam splitting cube 16, the P-type and S-type light beams are interleaved to not touch an adjacent light beam until combined at the stop aperture 37. The multiple beam optical head 30 provides interleaved focussed polarized light beams that have equal path lengths and are focussed to the stop aperture 37 of the stop plane 36 on exiting the second side 19b of the polarizing beam splitting cube 16.

Figure 4:
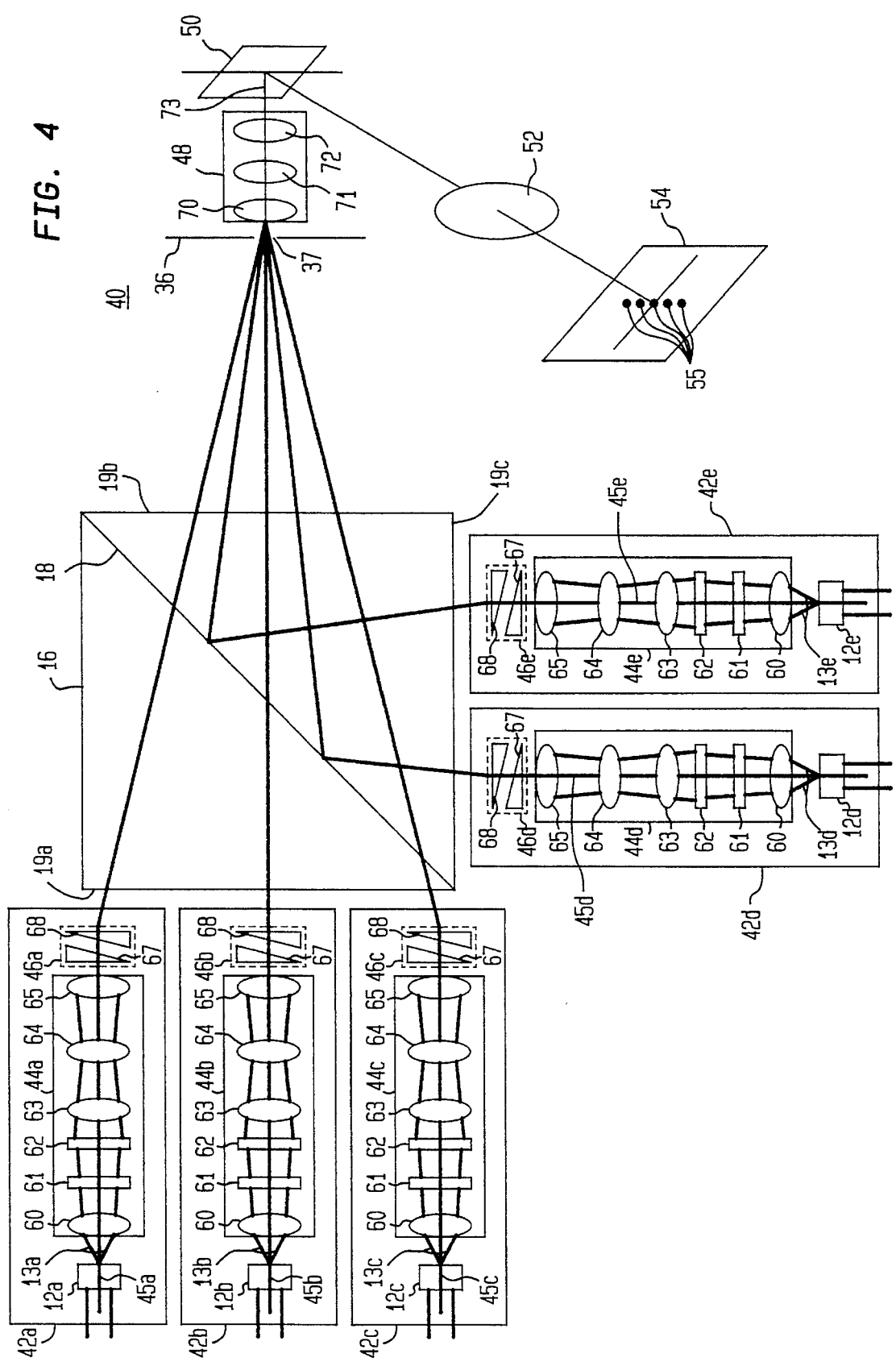
FIG. 4 is a block diagram of a multiple beam optical head printing system in accordance with a fourth embodiment of the present invention.

Referring now to FIG. 4, there is shown a multiple beam optical head printing system 40 in accordance with a fourth and preferred embodiment of the present invention which is similar to the multiple beam optical head 30 of FIG. 3. The multiple beam optical head printing system 40 comprises (a) first, second, third, fourth, and fifth channels (shown within separate rectangles) designated 42a, 42b, 42c, 42d, and 43e, respectively, (b) a polarizing beam splitting cube 16 with a polarization sensitive 18 formed therein, (c) a stop plane 36 defining a stop aperture 37 therein, (d) an optical system 48 (shown within a rectangle), (e) a deflector plane 50, (f) a scanning lens 52, and (g) a light sensitive print medium 54.

The channels 42a, 42b, 42c, 42d, and 42e comprise (a) lasers 12a, 12b, 12c, 12d, and 12e, respectively, for emitting respective diverging polarized light beams 13a, 13b, 13c, 13d, and 13e, (b) beam shapers 44a, 44b, 44c, 44d, and 44e, respectively, (shown within separate rectangles), and prism means 46a, 46b, 46c, 46d, and 46e, respectively, (shown within separate dashed line rectangles) disposed along respective optical axes 45a, 45b, 45c, 45d, and 45e. The lasers 12a, 12b, and 12c generate P-type polarized diverging light beams 13a, 13b, and 13c, respectively, while lasers 12d and 12e generate S-type polarized diverging light beams 13d and 13e, respectively. The beam shapers 44a, 44b, 44c, 44d, and 44e of the channels 42a, 42b, 42c, 42d, and 42e, respectively, receive the respective diverging polarized light beams 13a, 13b, 13c, 13d, and 13e from the lasers 12a, 12b, 12c, 12d, and 12e, respectively, and shape and then direct the respective shaped polarized light beams 13a, 13b, 13c, 13d, and 13e to the prism means 46a, 46b, 46c, 46d, and 46e, respectively.

Each of the beam shapers 44a, 44b, 44c, 44d, and 44e comprises a collector lens 60, first, second, third, and fourth cylinder lenses designated 61, 62, 63, and 64, respectively, and a spherical lens 65 disposed in sequence along the optical axes 45a, 45b, 45c, 45d, and 45e, respectively, of the respective light beams 13a, 13b, 13c, 13d, and 13e. The collector lens 60 receives the associated diverging polarized light beam 13a, 13b, 13c, 13d, or 13e and functions to reduce its divergence. The first and second cylinder lenses 61 and 62 receive the light beam passing through the collector lens 60 and have magnification power in a "Y" scan direction, while the third and fourth cylinder lenses 63 and 64 have magnification power in the "X" scan direction which is orthogonal to the "Y" scan direction. The spherical lens 65 receives the light passing through the fourth cylinder lens 64 and functions to converge the associated light beam 13a, 13b, 13c, 13d, or 13e to the stop aperture 37 of the stop plane 36 via the associated prism means 46a, 46b, 46c, 46d, or 46e. It is to be understood that the order of the cylinder lenses 61, 62, 63, and 64 can be changed in any suitable manner.

Additionally, the four cylinder lenses 61, 62, 63, and 64 in each of the beam shapers 44a, 44b, 44c, 44d, and 44e can be translated (moved) along an optical axis 45a, 45b, 45c, 45d, and 45e, respectively, to correct for any divergence difference of the polarized light beams 13a, 13b, 13c, 13d, and 13e, respectively, from the respective lasers 12a, 12b, 12c, 12d, and 12e. As a result of such cylinder lens translations, a same light beam size is provided at the output of each of the beam shapers 44a, 44b, 44c, 44d, and 44e. Each of the beam shapers 44a, 44b, 44c, 44d, and 44e generates a mildly converging circular light beam that is substantially focussed at the stop plane 36 after propagating through the polarizing beam splitting cube 16. Additionally, a pointing angle at which the light from each of the lasers 12a, 12b, 12c, 12d, and 12e is directed in reference to its mechanical mount (not shown) is different from one laser to the other. The light beam divergence variations and the laser pointing differences cause spot-to-spot beam size and position variations at the light sensitive print medium 54 from one spot 55 to the other. Therefore, the anamorphic nature of the associated polarized light beam in the X and Y orthogonal directions received by the beam shapers 44a, 44b, 44c, 44d, and 44e are compensated for by the cylinder lenses 61, 62, 63, and 64 of each of the beam shaper 44a, 44b, 44c, 44d, and 44e so that the light beams emerging from the beam shapers 44a, 44b, 44c, 44d, and 44e may be circular.

The shaped and converging polarized light beams 13a, 13b, 13c, 13d, and 13e from the beam shapers 44a, 44b, 44c, 44d, and 44e, respectively, are angularly directed and combined into one spot at the stop plane 36 by the respective prism means 46a, 46b, 46c, 46d, and 46e. Each of the prism means 46a, 46b, 46c, 46d, and 46e comprises a first and a second prism designated 67 and 68, respectively, whose rotation about the optical axis 45a, 45b, 45c, 45d, and 45e, respectively, deflects the light beam to the center of the stop 37 at the stop plane 36 after passing through the polarizing beam splitting cube 16. More particularly, the shaped and converging P-type polarized light beams 13a, 13b, and 13c for the channels 44a, 44b, and 44c, respectively, enter a first side 19a of the polarizing beam splitting cube 16, pass through the polarization sensitive 18 of the polarizing beam splitting cube 16, and exit a second side 19b and are focused at the stop plane 36. The shaped and converging S-type polarized light beams 13d and 13e for the channels 44d and 44e, respectively, enter a third side 19c of the polarizing beam splitting cube 16, are reflected by the polarization sensitive 18 of the polarizing beam splitting cube 16, and exit the second side 19b and are focused at the stop plane 36.

The optical system 48 comprises a plurality of three lenses 70, 71, and 72 disposed along an optical axis 73 to form a magnifying system. The optical system 48 functions to image at the deflector plane 50 a light image of the combined beams 13a, 13b, 13c, 13d, and 13e found at the stop 37. As a result, the combined light beams 13a, 13b, 13c, 13d, and 13e overlap each other at the deflector plane 50. More particularly, the light beams 13a, 13b, 13c, 13d, and 13e are angularly separated at the stop 37 by predetermined angles which are dependent on the separation distance of the optical axes 45a, 45b, 45c, 45d, and 45e of the beam shapers 44a, 44b, 44c, 44d, and 44e, respectively, and a optical path distance from an end of the prism means 46a, 46b, 46c, 46d, and 46e, respectively, to the stop plane 36.

The size of the combined beams 13a, 13b, 13c, 13d, and 13e at the deflector plane 50 is "m" times (magnification of optical system 48) the size of the combined beams at the stop 37, and the angular separation of the combined beams 13a, 13b, 13c, 13d, and 13e at the reflector plane 50 is reduced by a factor of "m". It is to be understood that any suitable number of lenses can be used in the optical system 48 which permit small beams with large angular separations at the stop 37 to be converted into large beams with small angular separations at the deflection plane 50. Usually the use of one lens in the optical system 48 is impracticable. The use of two lenses is a very restrictive arrangement requiring the lenses to be spaced very closely. The use of three lenses is sufficiently flexible and is not as complex and expensive as an optical system using more than three lenses.

The deflector plane 50 (e.g., a galvanometer mirror, polygon, or other such element) may be positioned at a front focal plane of the scanning lens 52. Thus, when the deflector plane (galvanometer mirror) 50 is rotated or oscillated, the beams 13a, 13b, 13c, 13d, and 13e may be telecentric to the light sensitive print medium 54. In other words, an incidence angle at the light sensitive print medium 54 may be zero in the scanning direction of the deflector plane 50 This has the advantage that if there is a focussing error, the beam separation between the different spots 55 is preserved. The incidence angle in a cross scan direction is usually not zero degrees in order to prevent the creation of fringes due to interference of light from different layers of the light sensitive print medium 54.

Additionally, by positioning the light sensitive print medium 54 at a back focal plane of the scanning lens 52, the beams 13a, 13b, 13c, 13d, and 13e projected onto the deflector plane 50 have their spots 55 located at the plane of the print medium 54. This provides for a large depth of focus. A moving galvanometer mirror at the deflector plane 50 then scans the spots 55 produced by the light beams 13a, 13b, 13c, 13d, and 13e across the light sensitive print medium 54 in a first direction while the print medium 54 is moved in a cross scan direction.

Various advantages are provided by the multiple spot optical heads 10, 20, 30 and 40 shown in FIGS. 1, 2, 3, and 4, respectively. A first advantage is that all of the optical path lengths are equal allowing for either collimated (as shown in FIGS. 1 and 2) or non-collimated (as shown in FIGS. 3 and 4) light beams. A second advantage is that no rotation of the multiple spot optical heads 10, 20, 30, and 40 is required which relaxes mechanical tolerances in the positioning of the lasers. More particularly, copending patent application Ser. No. 749,037 (T. Mackin et al.), filed on Aug. 23, 1991, discloses a high resolution thermal printer where a plurality of lasers are aligned at a predetermined acute angle to a line perpendicular to the rotation of a drum mounting a light sensitive print medium to provide selective very close spacings between adjacent spots on each line of an image being printed. Such rotation of the lasers 12a, 12b, 12c, 12d, and 12e, and their aligned light beams 13a, 13b, 13c, 13d, and 13e at the second side 19b of the polarizing beam splitting cube 16, is not required in accordance with the present invention. A fourth advantage is that all of the lasers 12a, 12b, 12c, 12d, and 12e can be modulated simultaneously when the rotation angle is zero degrees. This is opposite to the teaching of the copending patent application where the rotation angle is near ninety degrees, and the line of lasers are modulated in a predetermined sequence to produce rows of spots across a print medium. A fifth advantage is that the spacings of the spots 55 are adjustable in the plane of the print medium 54 by a corresponding adjustment of the spacing of the lasers 12a, 12b, 12c, 12d, and 12e.

It is to be appreciated and understood that the specific embodiments of the invention described hereinabove are merely illustrative of the general principles of the invention. Various modifications may be made by those skilled in the art which are consistent with the principles set forth. For example, other types of suitable orthogonal polarizations can be used. Still further, any number of lasers 12 can be used in the multiple spot optical heads 10, 20, 30 and 40 shown in FIGS. 1, 2, 3, and 4, respectively.

What is claimed is:

1. An optical head for printing an image on a light sensitive print medium using polarized laser light beams, the optical head comprising:

polarizing beam splitting means having a first surface, a second surface and a third surface for directly passing light beams with a first polarization passing through said first surface of the polarized beam-splitting means to said second surface which is located opposite the first surface, and for reflecting light beams with a second polarization orthogonal to the first polarization passing through said third surface of the polarizing beam splitting means to the second surface thereof;

a first group of lasers disposed in a first plane adjacent the first surface of the polarizing beam splitting means for transmitting a first group of laser light beams that are polarized with said first polarization, wherein the first group of laser light beams pass through said first surface and are transmitted directly to and pass through said second surface;

a second group of lasers disposed in a second plane adjacent the third surface of the polarizing beam splitting means for transmitting a second group of laser light beams that are polarized with said second polarization, wherein the second group of laser light beams pass through said third surface and are reflected to and pass through said second surface;

wherein the first group of laser light beams from said first group of lasers and the second group of laser light beams from said second groups of lasers have equal path length through said polarizing beam splitting means; and wherein said first group of lasers and said second group of lasers are located at predetermined spacing so that said first group of light beams and said second group of light beams form interleaved output laser light beams as said first and second groups of light beams exit the polarization beam splitting means from the second surface.

2. The optical head of claim 1 wherein the interleaved output laser light beams do not overlap.

3. The optical head of claim 1 wherein the interleaved output laser light beams partially overlap.

4. The optical head of claim 1 further comprising optical means disposed between said first group of lasers and said polarizing beam splitting means and between said second group of lasers and said polarizing beam splitting means, wherein said optical means shapes and directs the first group of laser light beams towards said first surface and the second group of laser light beams towards said third surface of the polarizing beam splitting means.

5. The optical head of claim 4 wherein the optical means comprises a separate collimating lens system for each laser in the first group of lasers and each laser in the second group of lasers.

6. The optical head of claim 4 wherein the optical means further comprises a separate focusing lens system for each laser in the first group of lasers and each laser in the second group of lasers.

7. The optical head of claim 6 wherein the optical means further comprises a separate lens aperture for each laser in the first group of lasers and each laser in the second group of lasers.

8. The optical head of claim 6 wherein each separate focusing lens system comprises:

a collector lens which is radially symmetric and has an aperture for receiving the diverging laser light beam from the associated laser;

first, second, third, and fourth cylindrical lenses disposed in any sequential order along a longitudinal axis of the focusing lens system for sequentially passing the laser light beam from the collector lens, the first and second cylindrical lenses having power in a first direction, and the third and fourth cylindrical lenses having power in a second direction for producing a circular output laser light beam; and a spherical lens for receiving the circular output laser light beam from the combination of the first, second, third and fourth cylindrical lenses and converging the laser light beam to a predetermined point.

9. The optical head of claim 8 wherein each focusing lens system further comprises prism means for directing the associated substantially circular output laser light beams towards said predetermined point.

10. The optical head of claim 1 wherein the lasers of the first group of lasers and the lasers of the second group of lasers are laser diodes.

11. The optical head of claim 1 wherein the interleaved output laser light beams exiting the polarizing beam splitting means have alternating polarization states.

12. The optical head of claim 1 further comprising:

a half wave retarding plate disposed between the optical means and the polarizing beam splitting means, wherein the retarding plate rotates the polarization state of at least one of the first group of laser light beams and the second group of laser light beams respectively generated by the first group of lasers and the second group of lasers.

13. The optical head of claim 1 further comprising:

shaping and pointing optics disposed after the second surface of the polarizing beam splitting means for shaping and pointing the first group of laser beams and the second group of laser beams at a predetermined point.

14. A printing system for printing an image on a light sensitive print medium, the printing system comprising:

polarizing beam splitting means having a first surface, a second surface and a third surface for directly passing light beams with a first polarization passing through said first surface of the polarized beam-splitting means to said second surface which is located opposite the first surface, and for reflecting light beams with a second polarization orthogonal to the first polarization passing through said third surface of the polarizing beam splitting means to the second surface thereof;

a first group of lasers disposed in a first plane adjacent the first surface of the polarizing beam splitting means for transmitting a first group of laser light beams which are polarized with said first polarization, wherein the first group of laser light beams pass through said first surface and are transmitted directly to and pass through said second surface;

a second group of lasers disposed in a second plane adjacent the third surface of the polarizing beam splitting means for transmitting a second group of laser light beams which are polarized with said second polarization, wherein the second group of laser light beams pass through said third surface and are reflected to and pass through said second surface;

wherein the first group of laser light beams from said first group of lasers and the second group of laser light beams from said second groups of lasers have equal path length through said polarizing beam splitting means;

wherein said first group of lasers and said second group of lasers are located at predetermined spacing so that said first group of light beams and said second group of light beams form interleaved output laser light beams as said first and second group of light beams exit the polarization beam splitting means from the second surface; and an optical system for causing the first group of light beams and the second group of light beams to form at least one row or column of corresponding spots on the light sensitive print medium.

15. The printing system of claim 14 wherein the interleaved output laser light beams do not overlap.

16. The printing system of claim 14 wherein the interleaved output laser light beams partially overlap.

17. The printing system of claim 14 further comprising optical means disposed between said first group of lasers and said polarizing beam splitting means and between said second group of lasers and said polarizing beam splitting means, wherein said optical means shapes and directs the first group of laser light beams towards said first surface and the second group of laser light beams towards said third surface of the polarizing beam splitting means.

18. The printing system of claim 17 wherein the optical means comprises a separate collimating lens system for each laser in the first group of lasers and each laser in the second group of lasers.

19. The printing system of claim 17 wherein the optical means further comprises a separate focusing lens system for each laser in the first group of lasers and each laser in the second group of lasers.

20. The printing system of claim 19 wherein the optical means further comprises a separate lens aperture for each laser in the first group of lasers and each laser in the second group of lasers.

21. The printing system of claim 19 wherein each separate focusing lens system comprises:

a collector lens which is radially symmetric and has a large numerical aperture for receiving the diverging laser light beam from the associated laser;

first, second, third, and fourth cylindrical lenses disposed in any sequential order along a longitudinal axis of the focusing lens system for sequentially passing the laser light beam from the collector lens, the first and second cylindrical lenses having power in a first direction, and the third and fourth cylindrical lenses having power in a second direction for producing a circular output laser light beam; and a spherical lens for receiving the circular output laser light beam from the combination of the first, second, third and fourth cylindrical lenses and converging the laser light beam to a predetermined point.

22. The printing system of claim 21 wherein each focusing lens system further comprises prism means for directing the associated substantially circular output laser light beams towards said predetermined point.

23. The printing system of claim 19, wherein the optical system further comprises:

a stop plane comprising a stop aperture therein to which the interleaved output laser light beams exiting the second side of the polarizing beam splitting means are directed by the optical means, wherein the output laser light beams are combined as they pass through the stop aperture; and optic means, disposed after the stop plane, for transforming the output laser light beams combined at the stop aperture at a first predetermined angular separation into optical system output laser light beams at an exit of said optical system with a second predetermined angular separation that are related by a predetermined magnification factor of the optical system.

24. The printing system of claim 23, wherein the optical system further comprises:

deflecting means disposed at the exit of said optical system for deflecting the optical system output laser light beams towards the print medium; and a scanning lens disposed between said deflecting means and the print medium for converting the optical system output laser light beams into a plurality of writing beams having a predetermined spacing and angular separation at the medium.

25. The printing system of claim 24 wherein the deflecting means is selected from a group consisting of a galvanometer mirror, a polygon mirror, and a hologon deflector which are movable to scan output laser light beams over the light sensitive print medium in a predetermined pattern.

26. The printing system of claim 14 wherein the lasers of the first group of lasers and the second group of lasers are laser diodes.

27. The printing system of claim 14 further comprising:

a half wave retarding plate disposed between the optical means and the polarizing beam splitting means, wherein the retarding plate rotates the polarization state of at least one of the first group of laser light beams and the second group of laser light beams respectively generated by the first group of lasers and the second group of lasers.

* * * * *